(No Model.)

C. F. G. STENDER.
HARNESS LOOP.

No. 318,818. Patented May 26, 1885.

Witnesses
W. C. Coates
A. M. Best

Inventor
Charles F. G. Stender
By Coburn & Thacher
Attorneys

UNITED STATES PATENT OFFICE.

CHARLES F. G. STENDER, OF CHICAGO, ILLINOIS, ASSIGNOR OF ONE-HALF TO THE GARFIELD MANUFACTURING COMPANY, OF SAME PLACE.

HARNESS-LOOP.

SPECIFICATION forming part of Letters Patent No. 318,818, dated May 26, 1885.

Application filed May 12, 1884. (No model.)

*To all whom it may concern:*

Be it known that I, CHARLES F. G. STENDER, a citizen of the United States, and residing at Chicago, in the county of Cook and State of Illinois, have invented certain new and useful Improvements in Harness-Loops, which are fully set forth in the following specification, reference being had to the accompanying drawings, in which—

Figure 1:
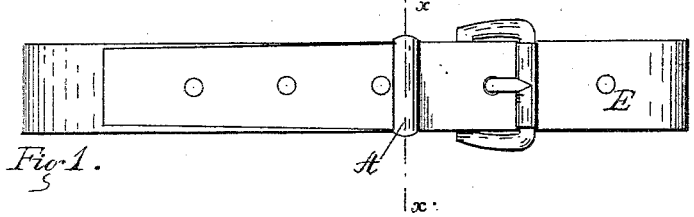
Figure 2:
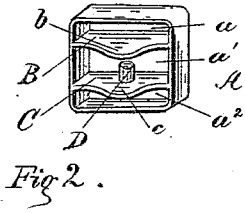
Figure 3:
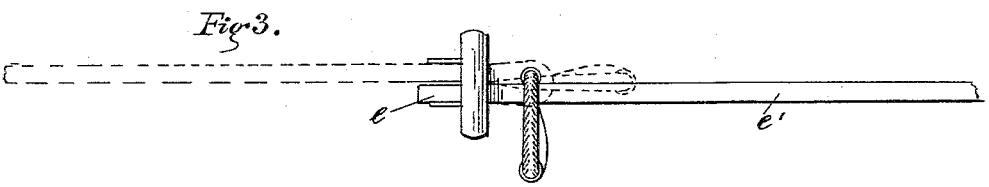
Figure 4:
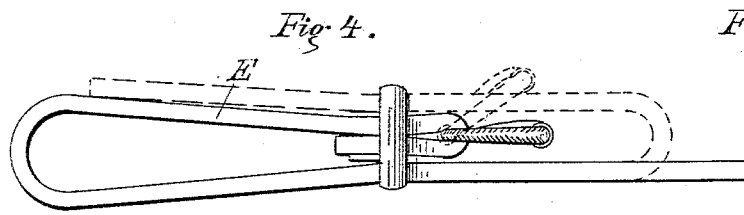
Figure 5:
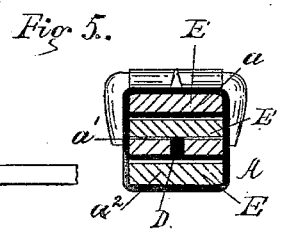
Figure 6:
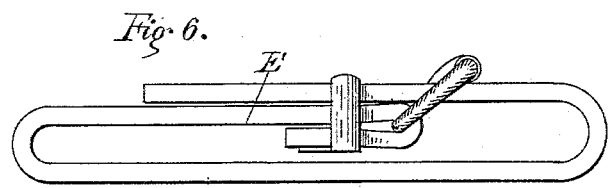
Figure 7:
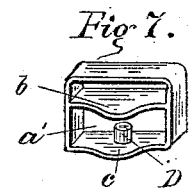
Figure 8:
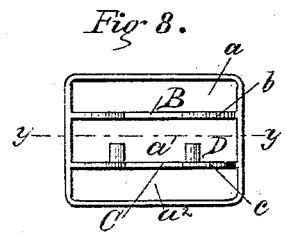
Figure 9:
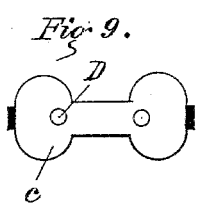

Figure 1 represents a plan view of a strap with my improved loop applied thereto; Fig. 2, a perspective view of the loop detached; Fig. 3, a side elevation of the strap with my improved loop, showing in full and dotted lines the manipulation of the strap in applying the loop so as to make the attachment thereof to the strap; Fig. 4, a similar view of the same, showing the further manipulation of the strap in connection with the loop so as to form a loop in the strap itself; Fig. 5, a sectional view taken on the line $x\ x$, Fig. 1; Fig. 6, a side elevation of a strap and loop, the latter being modified in construction; Fig. 7, a perspective view of this modified loop shown in Fig. 6; Fig. 8, a side elevation of my improved loop of an enlarged form for use with wide straps, and Fig. 9 a plan section of the same taken on the line $y\ y$, Fig. 8.

My invention relates to the article known to harness-makers and the trade as a "harness-loop," which, as is well known, is invented for application to the straps of harnesses wherever desired.

My present invention is an improvement on the loop described and shown in Letters Patent No. 279,609, which were granted to me June 19, 1883; and the object of this improvement is to dispense with the rivets used in my said patent, and thus to make the application of the loop more ready and easily accomplished.

I will proceed to describe in detail the construction and operation of harness-loops embodying my present improvement in practical form, and will then point out definitely in the claims the special improvements which I believe to be new and wish to protect by Letters Patent.

In Fig. 2 of the drawings I have shown what will probably be the most general form of my improved loop, and I will therefore describe this form first.

The loop consists of a substantially rectangular body, A, across which, running from end to end, are partitions or cross-bars B and C, which obviously divide the central opening of the loop into three parts, which, for convenience, may be designated an "upper way," $a$, a "middle way," $a'$, and a "lower way," $a^2$. On the lower cross-bar, C, there is a stud or pin, D, located about midway thereof, and each of these bars B and C is preferably provided with wings or projections $b$ and $c$, projecting out centrally from the side edges thereof on one side of the loop. This last device is not absolutely necessary, however, as will be seen further on in this description. The way $a'$ is twice the height of the remaining ways, and as these are of a height equal to the thickness of the strap which they are intended to receive, the way $a'$ is necessarily twice the thickness of the strap. The stud projects up about half the distance between the two plates.

The strap E (shown in the drawings) is merely given for the purpose of illustration, and of course it will be understood that the loop is intended for application wherever loops are used in harness-making.

In applying the loop to the strap, if a buckle is to be used, it must first be attached to the strap in the usual way. The short end $e$ of the strap beyond the buckle is then inserted in the middle way of the loop, between the two bars B and C, and the stud or pin on the lower one inserted in a hole prepared for it in the strap, as shown in Fig. 3 of the drawings. The long end $e'$ of the strap (shown in full lines in Fig. 3 of the drawings) is now doubled over and passed in under the bar B over the end of the stud and short end $e$ of the strap, as shown in dotted lines in Fig. 3 of the drawings. It is obvious that when this is done the loop is really attached to the strap, and cannot be removed therefrom. The way being exactly twice the thickness of the strap, and the stud being half as high as the way, the return of the strap fills up the whole of the way, so that the strap cannot possibly become detached from the stud except by being ruptured. In the further use of the strap and this loop the long end thereof, after being properly applied to any part of the harness for which it is intended, is passed back through the lower way, as shown in Fig. 4 of the drawings, and then after being buckled may be passed back again in the other direction through the upper way, as shown in dotted lines in the same figure, the cross-section, Fig. 5, also showing the relative position of all the parts under this arrangement.

As an additional security to the attachment of the loop to the strap, the wings $b$ $c$ may be provided, and when used they are to be clamped down on the strap when once doubled in the loop, as shown in Fig. 3 of the drawings. The fastening of the loop to the strap will thus be made firmer and stronger; but it is evident that without these wings the loop is securely attached to the strap, and hence it may be used either with or without these wings.

For some straps it may not be desired to provide the lower way, $a^2$, and the loop may be made without this portion, which is shown in Fig. 2 of the drawings. A loop of this modified form is shown in Fig. 7 of the drawings, and its application to a strap and use in connection therewith, fully shown in Fig. 6 of the drawings, will be understood from an examination of this last-named figure, as it differs slightly from the arrangement of parts already described above. The body of the loop in this form is integral, and the way in which the stud is set is twice the thickness of the strap, the stud being only as thick as the strap. Thus the strap being hooked onto the stud by means of the hole near its end, the buckle is put on it in the usual manner and the free end is then carried back through the same way, thus filling up all the space above the stud and preventing the strap from becoming detached in any possible manner other than tearing it from the loop.

For wide heavy straps it may be desirable to provide two studs for fastening the loop to the strap, for the purpose of greater strength and security. This form of loop I have shown in Fig. 8 of the drawings, in which the construction of the loop shown in Fig. 2 is retained, the only difference being that the studs are duplicated, and also the projecting wings, the latter in this instance being arranged to project on both sides of the loop, so as to be clamped down upon and hold the folds of the strap together on both sides of the loop. This arrangement of the wings may be used on the smaller loops also, if desired.

Having thus described my invention, what I claim as new, and desire to secure by Letters Patent, is—

1. A harness-loop composed of a solid rectangular body, one or more cross-bars, a stud or studs attached to one of the cross-bars or to a corresponding part of the body, and ways formed by the cross-bars and body, that one of the ways into which the stud projects being twice the height of the other ways, and the stud being half the height of the said way, substantially as shown and described, and for the purposes specified.

2. A harness-loop composed of a solid rectangular body, one or more cross-bars, a stud or studs attached to one of the cross-bars or to a corresponding part of the body, and ways formed by the cross-bars and body, that one of the ways into which the stud projects being twice the height of the other ways, the stud being half the height of said way, and the cross-bar or portion of the body above said stud being integral and rigid in contradistinction to a cross-bar divided into two or more parts to be bent down upon the strap, substantially as and for the purpose specified.

3. A harness-loop composed of a main body, two cross-bars, B and C, provided with wings $b$ $c$, projecting outward from one or both edges thereof, and a stud, D, on one of the said bars, substantially as and for the purposes set forth.

CHARLES F. G. STENDER.

Witnesses:
THOMAS H. PEASE,
W. C. CORLIES.